June 19, 1962 F. HAUSER 3,040,228
TIMING DEVICE
Filed Sept. 23, 1960 3 Sheets-Sheet 1

INVENTOR.
FRED HAUSER
BY
ATTORNEYS

June 19, 1962 F. HAUSER 3,040,228
TIMING DEVICE
Filed Sept. 23, 1960 3 Sheets-Sheet 2
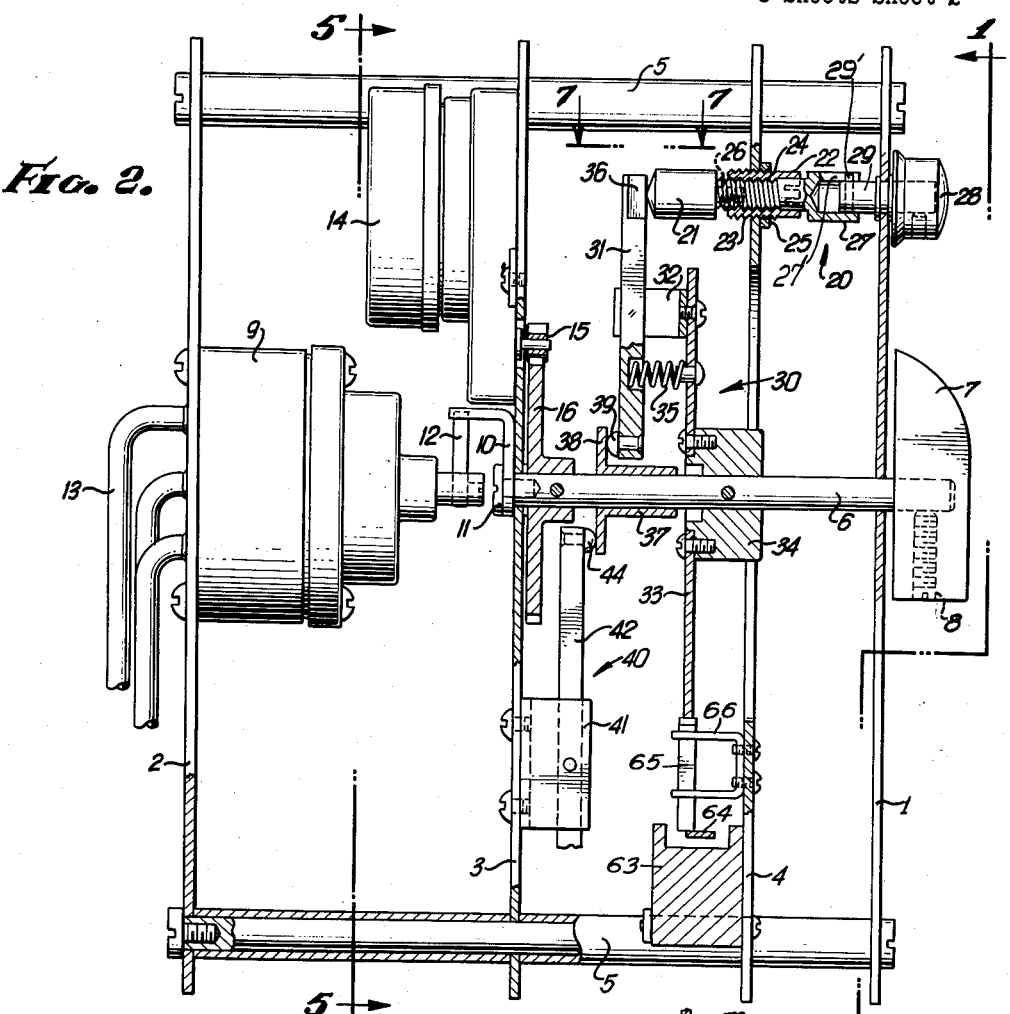
INVENTOR.
FRED HAUSER
BY
ATTORNEYS

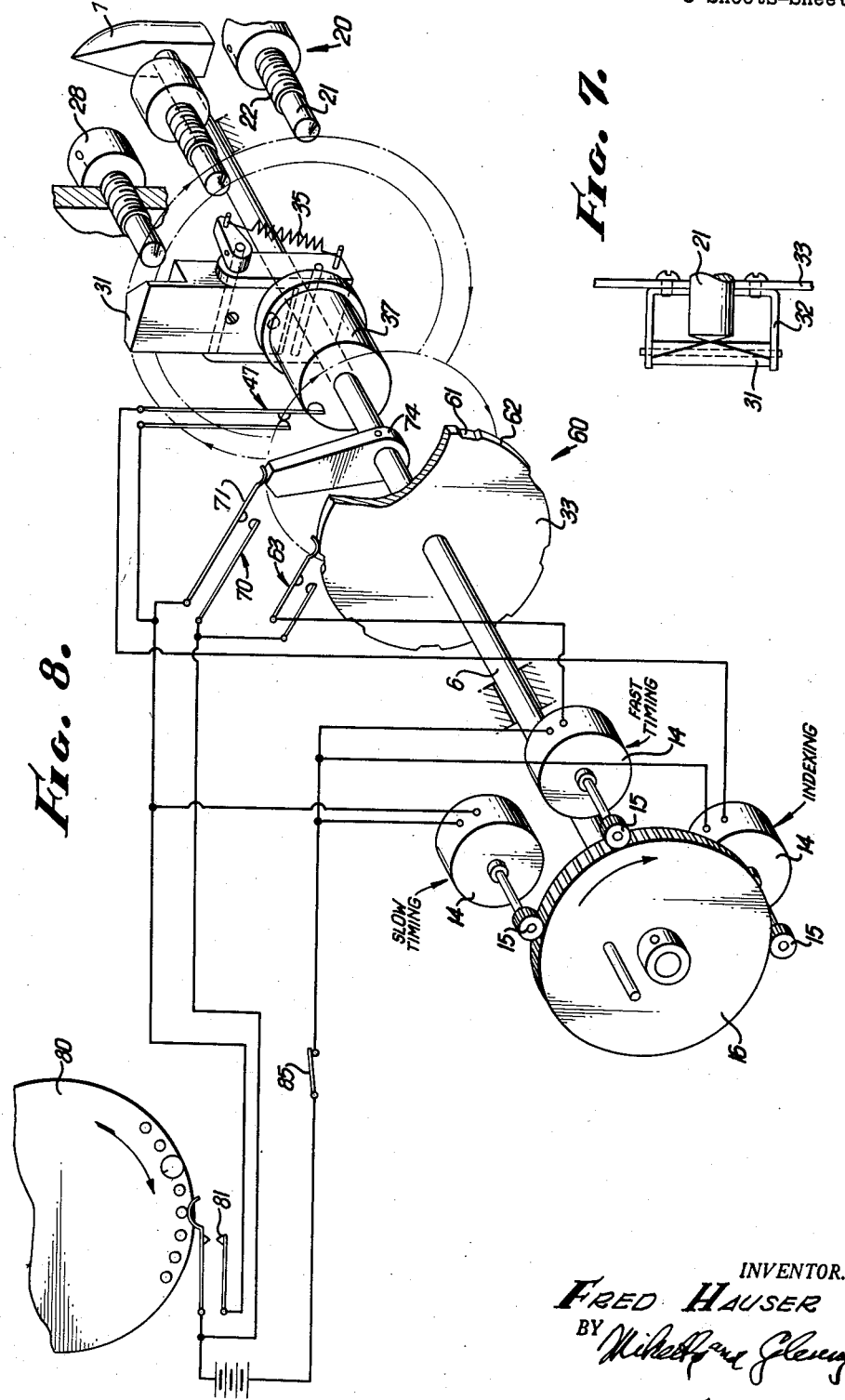

United States Patent Office 3,040,228
Patented June 19, 1962

3,040,228
TIMING DEVICE
Fred Hauser, 1544 Midvale Ave., Los Angeles, Calif.
Filed Sept. 23, 1960, Ser. No. 58,006
7 Claims. (Cl. 318—443)

This invention relates generally to timing devices of the kind normally employed in automatic sprinkling equipment, laundry equipment and the like, wherein electrical switches, pilot valves, etc., are operated in preselected time sequences. More particularly, this invention relates to an improvement in such devices which allows greater accuracy in adjusting and determining the duration of a timing period for certain preselected, ranges of a timing period of portion thereof.

Timing devices of the general nature in which I have made an improvement may be employed for sequentially timing multiple station control apparatus, one such device being disclosed in my co-pending application, Serial No. 6,482 filed October 14, 1959, for Timing Devices. Generally speaking, the timing device disclosed in my copending application is provided with a plurality of stationary timing units disposed in a generally circular orbital array, one for each station of the control apparatus being operated. Means are provided to orbitally move an indexing part or timing cam to register successively with the various orbitally disposed stationary timing units. Indexing drive means propel the timing cam at a relatively rapid rate between stations, thereby indexing it between successive stations. Each timing unit is provided with a projectable timing part and means associated therewith for adjusting the part to selected positions of projection into the path of the indexing part or timing cam which is periodically brought into register with each unit. A timing period duration is determined by the length of time required for the timing cam to contact and pass by a projected timing part of a individual timing unit. The further the timing part is projected into the path of the cam, the longer the corresponding timing period continues. Upon the timing cam's contacting or interfering with the timing part, the indexing means are made temporarily inoperative, and additional drive means propel the timing cam at a relatively slow orbital advance past the timing unit. The timing period is ended when the cam passes the timing unit, losing contact with the projected timing part, and the indexing drive means is made operative again to advance the timing cam at a more rapid rate to the next station. An indicator scale calibrated in units of time is normally provided on each timing unit to show the setting of the projectable timing part and indicate the duration of the timing period thereby established.

It has been found in the use of such timing devices, that certain timing periods or portions thereof are more critical than others. For instance, in a timing device employed in automatic lawn sprinkling systems, it is highly desirable that the shorter timing periods be very accurately determined since they are used primarily for watering newly seeded grass. It is imperative that a newly seeded lawn be sprinkled frequently but only for periods of short duration. A sprinkling operation of about two minutes is in order to keep the soil sufficiently moist for proper germination of the seed, yet prevent undue flooding. If a watering period is allowed to continue too long, the seed may be washed out requiring reseeding of the lawn, particularly where the ground contour is sloping or hilly. Longer sprinkling periods of less critical definition may be employed after the grass has taken root and is established. It can be seen therefore that a difference of one or two minutes when watering newly seeded lawn may be very critical while a difference of five to ten minutes in a period of sprinkling for a grown lawn may be of little consequence. Similarly, it is frequently found in other phases of automation, that certain ranges of timing periods, or portions thereof, are more critical than others.

It is therefore an object of my invention to disclose and provide a timing device adapted to provide more accurate setting of the timing mechanism in predetermined ranges of a timing period, sequence or portion thereof.

It is a further object of my invention to disclose and provide an improvement in multiple station control apparatus for sequentially timing various operations whereby the duration of any operation or portion thereof may be more accurately determined in certain critical ranges of a timing period.

It is a still further object of my invention to provide a timing device having indicator scale means associated therewith adapted to indicate the duration of a timing period for any given setting of the device wherein a portion of the scale is expanded to allow more accurate setting of the device relative to that portion, and wherein the driving means for the timing device is adapted to drive the mechanism at various speeds during a timing period to produce the timing period indicated by the scale.

Generally stated, my invention comprises a provision of a timing period duration indicator scale associated with at least one stationary timing unit wherein the scale in a timing device of the general nature before described is provided with an expanded portion in which the increments per unit of time are larger than the increments in the remaining portions of the scale. To compensate for the expansion of a portion of the scale, the timing drive means provided comprise both fast and slow timing drives to propel the timing cam past the projectable timing part of the timing unit during a timing period. The relatively fast timing drive means is employed to propel the timing cam during the portion of a timing period duration determined by movement of the projectable timing part relative to an unexpanded portion of the scale and the slow timing drive means is employed to propel the timing cam during the portion of the timing period duration determined by the movement of the timing part relative to an unexpanded portion of the scale. Means are further provided to activate the fast timing drive means during that portion of the timing period determined by movement of the timing cam relative to an expanded portion of the scale. Said means are further adapted to de-activate the fast timing means, thereby allowing the slow timing means to control orbital movement of the timing cam, during the portions of the timing period determined by movement of the projectable timing part relative to an unexpanded portion of this scale.

The aforementioned objects and advantages of the present invention, as well as the construction thereof, will become readily apparent upon consideration of the following more detailed description of an exemplary embodiment of the present invention. Reference will be made to the appended drawings, in which:

FIG. 2 is a vertical section of the timing device of FIG. 1 along the plane 2—2;

FIG. 3 is a detail view of a portion of the timing device of FIG. 1 taken along the plane 3—3;

FIG. 4 is a detail view of a portion of the timing device of FIG. 1 taken along the plane 4—4;

FIG. 6 is a detail view of a portion of the timing device of FIG. 1 taken along the plane 6—6;

FIG. 7 is a detail view of a portion of the timing device of FIG. 2 taken along the plane 7—7; and FIG. 8 is a generally schematic representation of the timing device of FIGS. 1 through 7.

Figures 1, 5:
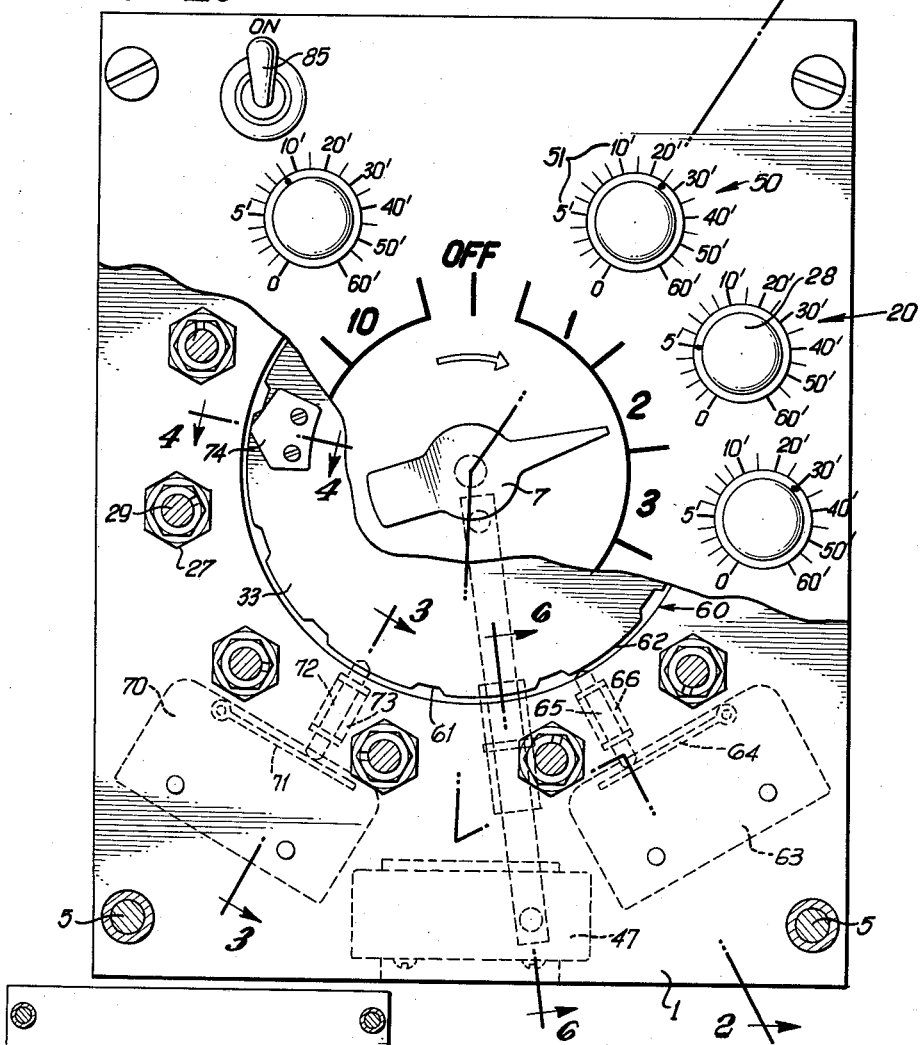
FIG. 1 is a frontal elevation, partially cut away, of a timing device employing the improvement according to my invention.
FIG. 5 is a transverse sectional view of the timing device of FIG. 2 taken along the plane 5—5.

Referring first to FIG. 1, the surface plate 1 of an exemplary embodiment of a mechanism for sequentially timing a multiple station control apparatus is shown with the markings 1 through 10 to indicate the various stations as well as an "Off" station. A plurality of individual stationary timing units 20 are disposed in a generally circular orbital array about the surface plate 1, each timing unit being associated with one of the stations 1 to 10. A pointer knob 7 indicates the station in operation. Each of timing unit knobs 28 shows the duration of a timing period for a setting of the timing unit by positioning to the indicator scales 50.

Referring now to FIG. 2, it may be seen that the timing device mechanism is disposed between four, generally vertical and parallel plates: a front plate or surface plate 1, a back plate 2, a median plate 3, and a forward intermediate plate 4; the four plates being joined by spacer bars 5. A shaft 6 is journalled in the surface plate 1 and the median plate 3 for rotation relative thereto. Plate 4 is made annular to allow the shaft 6 to pass freely therethrough. The pointer knob 7 is attached at the forward end of shaft 6 by means of a set screw 8. A hydraulic distributor pilot valve 9 (as commonly used in automatic lawn sprinkling systems) is shown mounted on plate 2 with its axis aligned with that of shaft 6. The rearward end of shaft 6 is provided with a dog 10 attached thereto by a pin 11. Dog 10 engages an arm 12 mounted on the distributor pilot valve 9. It may therefore be seen that rotation of shaft 6, causing pointer 7 to move relative to the stations 1 through 10 indicated on the surface plate 1, controls the pilot valve 9 to sequentially distribute fluid such as water through the various tubes 13 and thereon to the stations of use represented by the numbered stations on surface plate 1.

Referring to FIGS. 2 and 5, three motors 14, having overrunning clutch means associated therewith, are provided to propel the shaft 6 through the motor driven pinion 15 and cog wheel 16, wheel 16 being fixedly attached upon shaft 6. Motors 14 are provided with overrunning clutch means so that the most rapid running motor of the three controls the motion of shaft 6 even when all are operated simultaneously. The slowest running motor controls shaft 6 only when the faster running motors of motors 14 are deactivated. This allows selective driving speeds for shaft 6. In the exemplary embodiment, there are three speeds available. A greater number of motors could be provided or a single variable speed motor could be employed.

As best seen in FIG. 2, each of the timing units 20 is provided with a projectable timing part 21, having a generally conical tip in the embodiment shown, and means for adjusting the extent of projection of timing part 21. The unit is comprised first of a nut body 22 which has both an internal high pitch thread indicated at 23, and an external thread indicated at 24. Each unit body 22, of the units 20 is screwed into the annular forward intermediate plate 4 and held by a retainer nut 25 in a generally circular, orbital array.

The timing part 21 is mounted to the adapter head 27 by means of the screw 26. The adapter head 27 is joined to a timing knob 28 by means of a shaft 29 which is provided with a pin 29'. Shaft 29 is journalled in the surface plate 1 and is slidably connected to the adapter head 27, the head 27 being provided with an axial slot 27' for the pin 29' to slide in, as shown in FIG. 2. The projectable timing part 21 may therefore be selectively projected or retracted relative to plate 4 by turning the knob 28 as required. The knob 28 however does not move axially.

Scale means 50 are provided on the surface plate 1 for each of the timing units 20. As shown in FIG. 1, the scale or indicator is provided with increments which may be calibrated in units of time. The positioning of each of the knobs 28 may therefore be readily calibrated to the extent of projection of the projectible timing part 21.

Orbitally moving indexing means, indicated generally at 30, are provided to move an indexing part or timing cam 31 successively into register with each of the timing units 20. The indexing means, according to the exemplary embodiment, may comprise the indexing part or timing cam 31, which is pivotally mounted on a bracket 32, as best seen in FIGS. 2 and 7, and a disk 33 which supports bracket 32 and is fixedly mounted upon shaft 6 by means of a pinned support block 34. The timing cam or indexing part 31 is preferably biased by a spring 35 positioned near the lower end of part 31 to urge the cam surface 36 against the projectable timing part 21 interfering with each of the timing units 20 as it is brought into register therewith. The orbitally moving indexing means, indicated generally at 30 is propelled or indexed between the stations one through ten, as indicated on surface plate 1 by indexing drive means which may be provided in the form of one of the motors 14. Since during indexing motion, the controlled apparatus is usually inactive, being between operations, it is highly desirable that a relatively high speed motor be employed to rapidly propel the indexing means between stations. The most rapid running motor of motors 14 is therefore employed as the indexing drive means. The other motors of motors 14 may be operated at the same time, their overrunning clutch means allowing the fastest running motor to control the rotation of shaft 6.

Means to temporarily render the indexing drive means inoperative are provided so that when the indexing part or timing cam 31 comes into registry with a timing unit 20 and interferes with a projected timing part 21, the fast running indexing drive means is deactivated and a slower timing drive means is allowed to take over during a timing period. During the duration of a timing period, the indexing drive means is maintained inactive and timing drive means is operated. The period is ended when the interference between the cam 31 and a timing part 21 ends. The indexing drive means is then activated and the indexing means is indexed to the next successive station. As shown in FIGS. 1, 2 and 6 the means for temporarily deactivating the indexing drive means may be comprised of a pivoting arm assembly, indicated at 40, which is adapted to break an electrical circuit to the motor of motors 14 employed as the indexing drive means slidable sleeve 37; and a self opening switch 47. Sleeve 37 is provided with a flange 38 adapted to abut against the lower end of indexing part 31 at a contact button 39. Pivoting arm assembly 40, as shown, may be comprised of a pivot block 41 and a switch arm 42 pivotally supported on block 41 at pivot point 43. A contact button 44 at the upper end of arm 42 contacts the sliding sleeve 37. An adjustable contact pin 45 is held at the lower end of arm 42 by the locking nut 46 to contact the switch 47. Switch 47 is mounted on plate 4 by means of an angle plate 48. Arm 42 is preferably biased to move its lower end away from switch 47, breaking the contact between pin 45 and switch 47, and to move its upper end against sleeve 37. Sleeve 37 is thereby biased against cam 31 and toward the recessed block 34. Therefore, when the indexing part or timing cam 31 contacts a projectable timing part 21, the cam 31 pivots on bracket 32 such that sleeve 37 is allowed to move toward the recessed support block 34 under the bias of switch arm 42. The self-opening switch 47 then breaks a circuit and deactivates the indexing drive means, while the indexing part or cam 31 contacts a projectable timing part 21. Pivoting arm assembly 40 is forced to close switch 47 under the urging of spring 35 against the lower portion of indexing part 31 when the cam surface 36 passes the conical tip or timing part 21, thereby causing the indexing drive means to become operative again and drive the indexing means 30, through the interconnecting shaft 6, on to the next station.

Timing drive means are provided to drive the indexing means 30 during a timing period at a much slower rate than that compelled by the indexing drive motor. Said drive means may be comprised of a single multispeed motor, or as shown in FIGS. 5 and 8, of two separate motors of the motors 14, a fast timing motor and a slow timing motor. Normally, when the much more rapidly running indexing motor is operative, the fast timing motor is deactivated and the slow timing motor is being overrun. (The requirement of two motors or a single motor with at least two speeds of rotation for the timing drive means will be more fully understood subsequently after the scale means is more fully disclosed.) When the indexing motor is cut out, the timing drive means is operated to drive the shaft 6 and indexing means 30 during a timing period.

The duration of a timing period is therefore determined by the length of time that the timing cam 31 contacts or interferes with a timing part 21 of one of timing units 20 maintaining the self-opening switch 47 in an open setting. Such duration is adjustable by varying the extent of the timing part projection of 21 into the path of the cam 31.

Coming now more particularly to the improvement according to my invention, in timing devices of the nature heretofore described, I have devised means to provide more accurate setting of the timing units for certain ranges of the timing periods as hereafter described.

Sacle means 50, as shown in FIG. 1, are associated with each stationary timing unit 20 and timing knob 28 to indicate the duration of a timing period for a setting of a timing knob and therefore a setting of the projectable timing part 21. Each scale is provided with timing period duration increments indicated thereon calibrated to the positioning of the timing part 21 for various desired timing period durations. Increments, in units of time, for timing periods of from zero to 60' units are shown, the units being seconds, minutes or hours as desired. A portion of each of the scale means 50 is expanded as shown by the increments 0 through 10'. The knobs 28 may therefore be more accurately set in the range 0 to 10' than in the range 10' to 60'. A range of other than 0 to 10' could of course be employed.

Because of the expansion of scale means 50, in the range 0 to 10', as in the exemplary embodiment, the timing part 21 will undergo a greater projection or retraction for movement relative to the scale in that range than for movement relative to the rest of the scale. The ratio of the relatively greater movement of the timing part in that range compared to movement relative to an unexpanded portion of the scale 50 is directly proportionate to the ratio of the width of an increment per unit time on the expanded scale to that on the unexpanded portion of the sacle. Since the duration of a timing period is determined by the extent of projection of the timing part 21 into the path of cam 31, the duration of a timing period is similarly extended by the greater projection of timing part 21 relative to an expanded portion of the scale. The driving means provided to propel the cam 31 during the timing period are adapted to compensate for this effect.

Timing drive means, as in the exemplary embodiments may be provided by two of the motors 14, a fast timing drive motor and a slow timing drive motor, in addition to the indexing motor, as represented in the schematic representation of FIG. 8. The fast timing motor is adapted to run during a period of time corresponding to that indicated on the expanded portion of scale 50 and the slow timing motor is adapted to be operational on shaft 6 during the period of time indicated by an unexpanded portion of the sacle 50, as hereinafter described.

Means to activate the fast timing drive means during a portion of the timing period determined by movement of the timing part 21 relative to an expanded portion of the sacle and to deactivate it during a remaining portion of the period, if any, are indicated generally at 60 in FIGS. 1 and 8. Such means may include the disk 33, which is provided with notches 61 and rises 62, a self-closing switch 63 and circuits of generally known nature as best seen in FIG. 8. Disk 33 is fixedly mounted on shaft 6 and operably associated with the self-closing switch 63 by way of the spring switch arm 64. A contacting pin or transfer bar 65 is slidably mounted upon bracket 66 attached to the plate 4. As disk 33 rotates with shaft 6, the transfer bar 65 is moved downwardly against the upwardly biased spring switch arm 64 by each of the rises 62 opening the self-closing switch 63 to de-activate the fast driving motor means. Bar 65 is allowed to raise under the upward bias of arm 64 when a notch 61 passes by bar 65 allowing self-closing switch 63 to close and re-activate the fast timing drive motor. The slow timing motor is normally running when the timing device is functioning but the faster indexing motor and fast timing drive motor cause shaft 6 to overrun the slow motor when they are operational. However, when the indexing motor is de-activated by the switch 47 due to the cam 31 interfering with timing part 21, and the fast timing drive motor is de-activated due to a rise 62 on disk 33 opening switch 63, the slow timing drive motor operates upon the shaft 6 and indexing means, indicated at 30. The notches 61, on disk 33, which allow self-closing switch 63 to activate the fast timing drive motor are so selected upon the peripheral zone of disk 33 that the fast timing drive motor is operated for a period corresponding to that indicated by movement of timing part 31 relative to the expanded portion of scale 50.

Referring to FIG. 8, in calibrating the rises and notches on disk 33 for an expanded range of zero to ten on scale 50, as indicated in the exemplary embodiment, the knob 28 of a timing unit 20 is first set at ten. Disk 33 rotates with the cam 31 as shaft 6 rotates since both are fixedly attached thereto. When the cam 31 first touches the timing part 21 for this setting of the unit a notch 61 is started on disk 33 at the point thereon next to the bar 65 associated with switch 63. At the same time, therefore, the indexing motor will be cut out by the switch 47 and the fast timing drive motor activated or cut in by switch 63. When cam 31 leaves the timing part 21, ending the interference between the two after ten units of time have passed by, the notch 61 on disk 33 ends and a rise 62 begins cutting out the fast timing motor at the same time that switch 47 is closed cutting back in the indexing motor. With this exemplary calibration of rises 62 and notches 61 on disk 33, the timing device is adapted for a timing period of ten units or less within the expanded portion of the scale 50. A period of ten units or less would therefore employ only the indexing and fast timing motors alternately. The slow timing motor, while running would always be overrun by the other two motors. However, with this same calibration of disk 33, all three motors would be employed if a timing unit is set for a period of more than ten units. Still referring to FIG. 8, if the timing part 21 is set for a twenty minute timing period, for example, the part 21 is projected further into the path of cam 31. Cam 31 de-activates the indexing motor sooner in its orbital movement than before since the cam surface as best seen in FIG. 7, contacts timing part 21 interfering therewith sooner than the prior setting for a ten unit period. The indexing motor is cut out by switch 47 but the fast timing motor is not yet activated, since the corresponding notch 61 on disk 33 for the ten unit setting has not activated the switch 63 yet. Therefore, the slow timing motor operates shaft 6 for a period of five time units, the fast timing motor is then activated by a notch 61 closing switch 63 for ten timing units thereafter cutting it out as a raise 62 contacts switch 63, and then the slow timing drive motor is again operational on shaft 6 for five more time units, said units adding up to 20 equal time units. At the end of the period, the cam 31 leaves contact with the timing part 21 and the indexing motor indexes the indexing means 30 to the next station and next of the timing units 20. Such calibration of disk 33 may be employed to give fast timing drive to shaft 6 for any range of timing units as desired and as indicated by an expanded portion of the scale 50.

Referring now to FIGS. 1, 3, 4 and 8, it may be seen that in the exemplary embodiment shown, an "Off" position or station is provided wherein the timing device is completely de-activated. When pointer 7 is pointing vertically, a self-closing switch 70, shuts off the entire device. Switch 70 is provided with a spring arm or contact arm 71. A transfer bar 72 is slidably mounted on a bracket 73 on plate 4, such that switch 70 is opened by the action thereon of a switch activating member 74 mounted on the notched disk 33, as shown schematically in FIG. 8, and physically in FIG. 1.

A timer starting mechanism is shown generally at 80 in FIG. 8. This mechanism may be comprised in part of a clock and is adapted to start the timing device set in the "Off" position at any desired time by the closing of a switch 81 in the electrical circuit, as shown, to bypass the open switch 70 and start the shaft 6 rotating under the urging of the indexing motor. Switch 70 is thereafter closed, bypassing the subsequent opening of switch 81, allowing the timing device to follow its sequence of timing periods as adjusted until the "Off" position is reached upon completion of the cycle. A sprinkling system may thereby be turned on at any desired time and the sequence of watering stations supplied for varying timing period until the complete sequence is ended.

An additional off-on switch 85 may be provided in the circuit as shown in FIG. 8 to interrupt the operation of the timing device manually at any time.

It is therefore apparent, that by the provision of my improvement in timing devices as herein disclosed and fully described, it is possible to simply and inexpensively provide a timing apparatus which may be very accurately set in a preselected range of a timing period.

It should be understood, that a timing device employing only one timing unit may be provided according to my invention and that when more than one timing unit and station is used, as in the exemplary embodiment, some units may be provided with expanded scales while others are not. Furthermore, the various units may be calibrated in different units of time, and the expanded portion of the scale 50 need not be only at the beginning of the scale but may be provided in any range of the scale. Also, it is possible to provide more than one expanded portion of the scale and said portions may all have different increment widths per unit of time. A timing drive motor may be provided for each of said expanded portions adapted to drive the timing cam 31 at a rate suitable to compensate for the greater movement of the timing part 21 into the path of the timing cam 31 for motion of the cam 31 relative to the expanded portions. It is therefore apparent that the embodiment of the improvement in timing devices, according to my invention, is exemplary only and that other modifications, embodiments and adaptations may be employed within the scope of my invention as described by the following claims.

I claim:

1. In a mechanism for sequentially timing a multiple station control apparatus having: a series of adjustable stationary timing units, one for each station of said apparatus, said units being disposed in orbital array; orbitally moving indexing means having an indexing part adapted to register successively with said stationary timing units while moving in orbit; indexing drive means for propelling said indexing means at a relatively rapid rate for orbitally indexing said indexing part between stations; each of said timing units including a projectable timing part and means for adjusting said timing part to selected positions of projection in the path of orbital movement of said indexing part; means to temporarily render said indexing drive means inoperative upon said indexing part interfering with said timing part for the duration of a timing period determined by the adjusted position of projection of said timing part; and timing drive means to effect relatively slow orbital advance of said indexing part past said timing part during said timing period and for disengaging said indexing part from said timing part at the end of said timing period and to thereby render said fast driving indexing drive means again operative to index said indexing part to the next station, the provision of: a timing scale associated with each stationary timing unit, said scale having time unit increments indicated thereon calibrated to the positioning of the timing part of various desired timing period durations, said scale further having an expanded portion in which said increments per unit of time are larger than said increments per unit of time in an unexpanded portion of said scale; said timing drive means including fast timing drive means and slow timing drive means; and means to selectively activate said fast timing drive means during a portion of the timing period determined by movement of said timing part relative to an expanded portion of said scale and to de-activate said fast timing means during a portion of the timing period determined by movement of said timing part relative to an unexpanded portion of said scale.

2. In a mechanism for sequentially timing a multiple station control apparatus including an adjustable stationary timing unit for each station and indexing means associated therewith having an indexing part adapted to register successively with said units wherein a timing period is determined by the duration of interference between said indexing part and a portion of each of said units selectively projectable into the path of said indexing part, the provision of: indexing drive means for propelling said indexing means as a relatively rapid rate between stations; means for de-activating said indexing drive means when the indexing part interferes with a portion of any one of said timing units and for re-activating said means when said indexing part is out of interference with said units; timing drive means for propelling said indexing means as a relatively slow rate in the region of said stations when said indexing part is in interference with said timing unit, said timing drive means having a multiple speed drive selectively operable to propel said indexing part at variable speeds while in interference with a portion of any of said timing units; a timing indicator scale for each stationary timing unit, said scale having increments thereon calibrated to the adjustment of said timing units, for various timing period durations said scale having at least a portion thereof wherein said increments per unit of time are expanded to allow greater accuracy in setting said timing units relative to such expanded portion of said scale; and means to selectively operate said timing drive means at preselected speeds to correlate the speed of propulsion of said indexing part while interfering with one of said timing units to the timing period indicated on said scale.

3. In a mechanism for sequentially timing a multiple station control apparatus, comprising: a series of stationary timing units, one for each station of said apparatus, each of said timing units including an adjustable timing part and means for adjusting the same to selected positions of adjustment determinative of corresponding durations of a timing period for each such timing unit without effecting the timing period duration of any other station; an indexing member movable in a closed-circuit path and having a part arranged to successively register with the timing parts at the successive stations; relatively fast driving means for moving said indexing member in said closed circuit path whereby to index said indexing parts successively between stations; means for rendering said relatively fast driving means inoperative for the durations of timing periods in which said indexing part is in contact with the timing part of a respective timing station; and timing drive means to effect relatively slow orbital advance of said indexing part past said timing part during said timing period and for disengaging said indexing part from said timing part at the end of said timing period and to thereby render said fast driving means again operative to index said indexing part to the next station, the provision of: a timing scale associated with each stationary timing unit, said scale having increments thereon to indicate the selected position of adjustment of the associated timing part, said scale further having an expanded portion in which said increments are larger than those in an unexpanded portion of said scale; said timing drive means comprising a fast drive motor and a slow drive motor; and means to selectively activate said fast drive motor during a portion of the timing period determined by adjustment of said timing part relative to an expanded portion of said scale and to de-activate said fast driving motor during a portion of the timing period determined by adjustment of said timing part relative to an unexpected portion of said scale, said slow driving motor being operative on said indexing member during said last named portion of said timing period.

4. In a timing device employing a timing cam moving in a predetermined path relative to an adjustable timing unit having a movable timing part adapted to be selectively projected into the path of said cam, said cam interfering with said timing part in a manner determined by the extent of projection of said part into the path of said cam, the duration of a timing period of said device being determined by the time required for said cam to pass said timing part, the provision of: a scale associated with said timing unit having increments indicated thereon calibrated to the positioning of said timing part relative to the path of said timing cam for various desired timing period durations, said scale further having an expanded portion in which said increments per unit of time are enlarged relative to increments per unit of time in an unexpanded portion of said scale; drive means associated with said timing cam for propelling said cam through said predetermined path past said timing part, said drive means including fast drive means and slow drive means; and means to selectively activate said fast timing drive means during a portion of the timing period determined by movement of said timing part relative to an expanded portion of said scale and to de-activate said fast timing means during a portion of the timing period determined by movement of said timing part relative to an unexpanded portion of said scale, said slow timing drive means being operative on said timing cam during said last named portion of said timing period.

5. A device as in claim 3 wherein said timing cam is mounted upon a rotatable shaft for generally circular orbital movement about the axis of said shaft past said movable timing part; and said means to activate and de-activate said fast timing drive means comprises: a notched disk mounted on said shaft having raised and depressed edge portions about its periphery; and switch means associated with said fast timing drive means for activating and de-activating said drive means, said switch means being adapted to be operated by the variations in contour of the edge portions of said disk.

6. In a multiple station timing device for imparting variably timed rotary motion to a timing shaft the combination of: a timing shaft; a plurality of timing and indexing motors operably associated with said shaft to selectively drive said shaft at various speeds, each of said motors being operable at an output speed differing from each of the others of said motors; a plurality of stationary timing units arranged in orbital fashion around said timing shaft, each of said units having an adjustable timing knob; cam means mounted on said timing shaft to successively engage portions of said timing units associated with said timing knobs as said timing shaft is rotated; graduated scale means associated with each of said timing knobs, said timing knobs being adjustable relative to said graduated scale; and means for selectively operating said plurality of timing and indexing motors to successively rotate said timing shaft in response to the adjustment of each of said timing knobs to a corresponding graduated scale means associated therewith.

7. In a timing device employing a timing cam moving in a predetermined path relative to an adjustable timing unit, the unit having a movable timing part adapted to be selectively projected into the path of the cam, the combination therewith of: a plurality of timing and indexing motors adapted to selectively propel the timing cam; graduated scale means associated with said timing unit, said unit being adjustable relative to said scale as the timing part is selectively projected into the path of the cam; and means for selectively operating each of the plurality of timing and indexing motors to propel the cam in response to the adjustment of the timing unit relative to the gradauted scale means.

References Cited in the file of this patent

UNITED STATES PATENTS 2,637,835     Davidson _____ May 5, 1953